April 23, 1935.  E. C. HORTON ET AL  1,998,759
BLADE AND ARM FOR WINDSHIELD CLEANERS
Filed Oct. 13, 1930
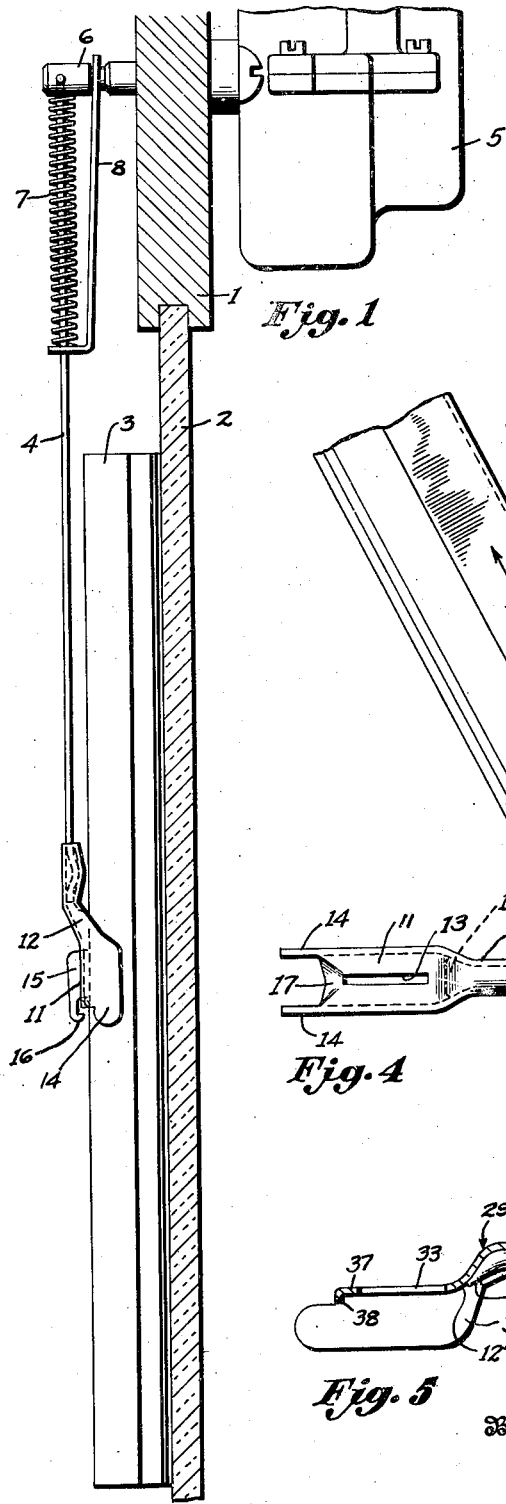
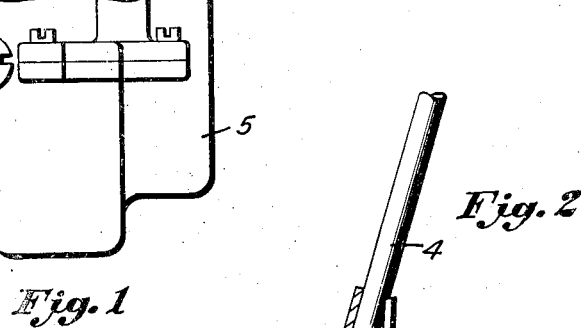
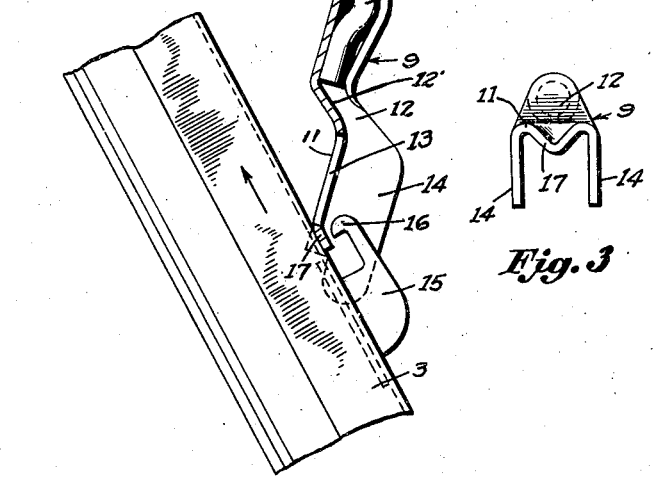
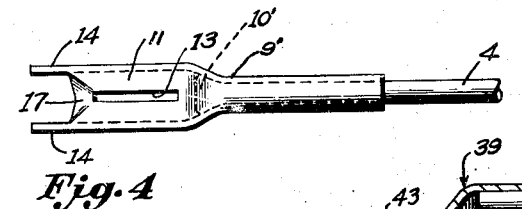
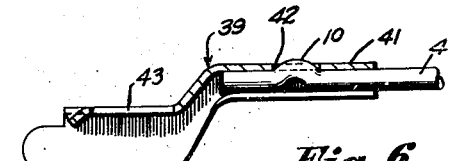
Inventors
Erwin C. Horton
Henry Hueber Patented Apr. 23, 1935

1,998,759

UNITED STATES PATENT OFFICE 1,998,759

BLADE AND ARM FOR WINDSHIELD CLEANERS

Erwin C. Horton, Hamburg, and Henry Hueber, Buffalo, N. Y., assignors to Trico Products Corporation, Buffalo, N. Y.

Application October 13, 1930, Serial No. 488,528

7 Claims. (Cl. 15—250)

This invention relates to a mounting for wiper blades and has particular reference to the attachment of wiper blades to their supporting arms without the necessity of attaching screws or the use of tools.

Formerly the blades have been attached to their wiper carrying arms by means of screws or bolts which very soon became rusted and would frequently break when repairing or replacing the blade, thereby necessitating the furnishing of an additional attaching element, and sometimes requiring the substitution of a new arm and blade assembly in its entirety. Attempts have been made to provide a readily attachable wiper blade, and toolless mountings have been devised and utilized which have proven more or less satisfactory but have also embodied an objectional degree of flexibility or play in order to provide for the required and much desired flopping action in the blade mounting.

The present invention contemplates a detachable wiper mounting in which the blade may be readily mounted and replaced without the use of tools; and also contemplates a readily attachable mounting in which the wiper blade is supported firmly while permitting of the required flopping action. The improved mounting comprises an improved wiper blade attaching part which may be economically constructed and which will permit of ready attachment of the wiper blade upon partial rotation thereof relative to the attaching part, but which will positively retain the blade when the carrying arm is lifted from the surface of the windshield for cleaning or the like.

These and other objects and advantages will become apparent from a perusal of the following description of typical devices embodying the principles of the invention, reference being made to the accompanying drawing wherein:—

Fig. 1 is a fragmentary sectional view through a windshield equipped with the windshield cleaner showing the present invention in side elevation;

Fig. 2 is a vertical sectional view taken through the blade attaching part the blade being shown in elevation and in detachable relation to the attaching part;

Fig. 3 is an end view of the blade attaching part;

Fig. 4 is a front elevational view of the same slightly modified as to the arm securement;

Fig. 5 is a sectional view of a modified blade attaching part on the wiper arm of Fig. 4; and Fig. 6 is a similar view of another modified construction.

As shown in Fig. 1, the numeral 1 designates a header bar disposed directly above the vehicle windshield glass 2, the latter being acted upon by the windshield wiper blade 3 carried by the wiper arm 4 through which the blade is reciprocated by suitable means such as the motor 5 mounted upon the header bar 1. The wiper blade and arm are formed with interlocking or interengaging parts which permit of ready attachment and replacement of the blade as well as providing for the desired degree of limited angular movement resulting in the well known flopping action to thereby insure the blade assuming the proper wiping angle with respect to the glass 2.

The upper end of the wiper arm 4 is attached to the motor rock shaft 6 by suitable spring means 7 and wire connecting means 8 so that the wiper arm may be lifted or rotated upwardly and outwardly about the rock shaft in a plane normal to the windshield allowing the wiper arm to assume a horizontal position. The lower or wiper end of the arm 4 is provided with a slotted wiper blade engaging part 9 comprising a metal stamping which is adapted to be pressed over and around a crimp or bend 10 formed in the arm. The lower or saddle portion 11 of the stamping 9 is rearwardly offset at 12, as viewed in Fig. 1, and has a slot 13 extending lengthwise thereof and is flanked by a pair of depending flop determining ears 14 to provide a seat of substantially U-shape cross section for the reception of the blade 4. The latter is provided with a fin extension 15, which may be formed integrally with the blade part or attached thereto in any known manner, such for example as disclosed in Patent Number 1,946,073, issued Feb. 6, 1934. The interlock between the arm 4 and the holder 9 may be effected by placing the bend or crimp at the extreme end of the arm 4, as indicated at 10' in Figs. 4 and 5. The extreme end is angularly deflected to lie against the offsetting shoulder 12' and, to increase the effectiveness of the key-like interlock, the deflected portion 10' is flattened into a flare or fan shape, as shown by the dotted lines in Fig. 4, about which the metal stamping is pressed. The socket part 9' of the holder embraces the adjacent round part of the arm and flares outwardly into the saddle portion 11.

The hooked end portion 16 of the fin 15 is spaced from the body of the blade 4 a distance slightly greater than the thickness of the metal of the stamping 9 and the fin is adapted to extend through the slot 13 of the stamping as shown in Fig. 1, the slot being slightly longer than the base of the fin which extends therethrough thereby allowing for slight longitudinal movement of the blade. The flop defining ears 14 are spaced a distance greater than the width of the blade permitting of angular or flopping movement of the latter about an axis coincident with the slot 13.

The blade may be removed from the holder 9 upon angular movement thereof in a plane to withdraw the central portion of the hook from the slot 13 and to bring the forward end 17 of the saddle portion 11 into registry with the space between the hook end 16 and the blade body. In order to prevent accidental disengagement of the parts when the arm 4 is elevated or lifted outwardly from the windshield 2 against the inward pressure of the spring means 7, the end portion 17 of the saddle is bent or depressed inwardly so that a large angular movement of the blade about the lower end of the arm of nearly one half turn is necessary to aline the parts for disengagement. The relative position of the parts when such disengagement may take place is depicted in Fig. 2.

It will be understood that when the windshield is being cleaned or for other reasons the arm 4 is rotated to a horizontal position about an axis normal to the axis of the motor rock shaft 6, the blade 4 will not become disengageable until a further clockwise rotation of nearly one half turn is made, the effective thickness of the end portion 17, due to its inward depression, preventing passage of the end portion between the hook end 17 and the blade body. The blade 4 may be attached to the arm by bringing the parts to the relative position shown in Fig. 2 and then mounting them and moving them to the position shown in Fig. 1.

In Fig. 5 is illustrated a modified holder 29 having a saddle portion with a slot 33, flop determining ears 34, and an arm engaging portion 35. The portion of the saddle 37 forward of the slot 33 is provided at its end with a downwardly turned tip 38 as viewed in Fig. 5, which functions to prevent accidental disengagement of the blade in substantially the same manner as described in connection with the device shown in Figs. 2, 3 and 4.

Fig. 6 illustrates a further modification of the blade holder which is identical with the holder illustrated in Figs. 2, 3 and 4 except in the manner of attaching the blade holder to the wiper arm 4. The holder 39 comprises an arm engaging portion 41 having an opening 42, and an offset saddle portion 43. In applying the holder to this arm, the portion 41 is pressed around the wiper end of the arm 4, the bent portion 10 of the arm extending through the opening 42. In this manner the parts 4 and 39 are rigidly held together, the side walls of the opening 42 preventing relative rotary movement therebetween and the end walls preventing movement axially of the rod.

The deformed portions 17 and 38 serve to increase the apparent thickness of the blade holder, or that portion thereof which is interengaged with and beneath the hook part 16 so that the effective thickness of the holder portion is greater than the spacing of the hook part 16 from the back of the blade. The blade is thereby held against displacement from the holder until the blade has been turned so as to dispose the major thickness or dimension of the deformed portion to an inoperative position and present the minor dimension thereof to the slot between the hook 16 and the blade back for passage therethrough. Such deformed portion is so disposed as to require more than mere accidental movement of the blade relative to the holder, and rather a decided abnormal relative movement.

It will now be understood that the present invention provides a simple and effective means whereby the wiper blade 3 may be securely held engaged with the wiper blade arm 4, the spring connection means 7, 8 of the arm and motor rock shaft holding the blade in contact with the windshield 2. The slot and ears formed on the holder element coact with the blade and its appended fin 15 to retain the blade and holder engaged during operation of the wiper and permit of the necessary flopping of the blade. The inwardly depressed portion 17, or the bent portion 38 of the modified construction, of the holder will prevent accidental disengagement of the blade and arm when the latter has been moved away from the windshield, it being necessary to move the blade through substantially one half turn relative to the arm in a plane normal to the windshield to effect removal of the blade. The latter may be readily removed or replaced however by bringing the parts to such angular relationship without the use of tools or additional fastening elements. The holder stamping may be rigidly and permanently secured to the arm by pressing it around the bend formed in the arm, the bend preventing relative movement between the parts.

It will further be understood that the devices herein described are merely exemplary of the principles of the invention which is intended to be of scope commensurate with the appended claims.

What is claimed is:

1. A wiper mounting comprising a blade carrying arm having a seat with a longitudinal slot adjacent the outer end thereof, said seat having an angularly deflected portion between said slot and the outer end thereof, a wiper blade having an attaching part projecting from its back, said part being received in said slot and having a hook portion overhanging the angularly deflected portion of said seat.

2. In a wiper mounting, a blade holder having a substantially flat portion with a slot extending longitudinally thereof and an angularly deflected portion between said slot and one end of said holder, and a blade having an attaching element extending through said slot, said attaching element having a hooked end portion to receive interlockingly said angularly deflected portion.

3. In a wiper mounting, a blade holder having a longitudinal slot and a deflected portion between the slot and one end thereof, and a blade having an attaching element extending through said slot, said attaching element having a hooked end portion to interlockingly receive said deflected portion, the latter extending from the plane of the holder a distance greater than the thickness thereof and the hooked end portion of the attaching element being spaced from the blade a distance less than the distance of deflection of said deflected portion.

4. As an article of manufacture, a wiper blade holder comprising substantially a flat portion having a slot extending longitudinally thereof, a pair of ears depending from the sides thereof, and a portion between the slot and one end thereof depending angularly from the plane thereof.

5. A wiper mounting comprising a blade carrying arm having a blade holder at one end thereof, said holder having a longitudinal slot therein and laterally disposed ears, and a wiper blade disposed between said ears and having a projection extending into said longitudinal slot, said projection having a hooked end thereon overhanging and interlocking the portion of said holder between the slot and an end thereof, said portion extending angularly with respect to the adjacent portions of the holder to render the effective thickness of said portion greater than the distance between the hooked end and the back of the blade when the blade and portion are operatively related.

6. A wiper blade carrying arm for a windshield wiper blade having a hooked projection extending from its back, said arm having at one end a blade holding part of substantially U-cross section for straddling the back of the blade, the web portion of said part having a longitudinal slot therein for receiving the projection extending from the blade, the outer end of said web portion being adapted to be passed between the back of the blade and the end of the hooked projection when the blade is attached to the arm, and said end of the web portion being angularly deflected from the plane of the slotted surface.

7. A wiper blade carrying arm for a windshield wiper blade having an attaching fin with an overhanging part cooperating with the blade in defining a restricted entrance way to a recess between the overhanging part and the blade, said arm having a slot to receive the fin and a portion extended angularly to the plane of the slotted portion beyond the slot adapted to be passed through said entrance way into the recess upon angular displacement of the blade relative to the arm to thereby interlock the fin in the arm slot upon restoring the arm and blade to normal operating relationship.

ERWIN C. HORTON.
HENRY HUEBER.